T. S. SHENSTON.
Inkstands.
No. 144,929.  Patented Nov. 25, 1873.
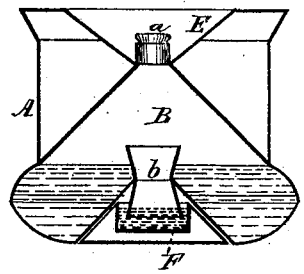
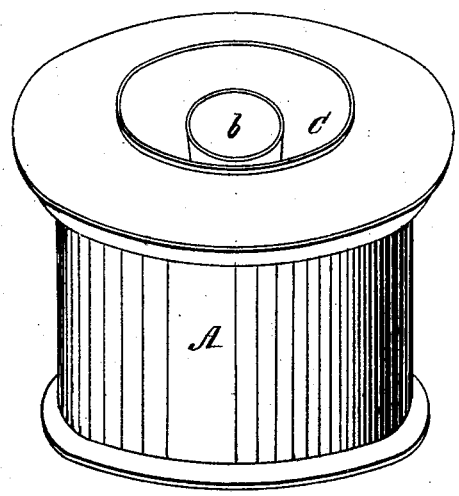
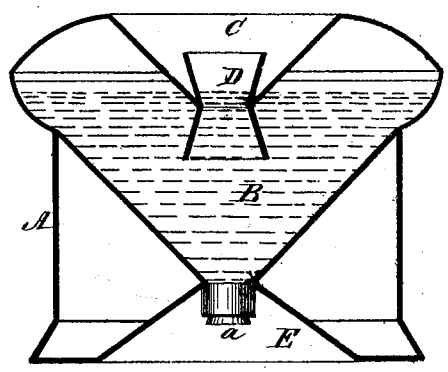
Witnesses:
G. Mathys
A. W. Hart
Inventor:
Thomas S. Shenston
Per _____
Attorneys.

UNITED STATES PATENT OFFICE.

THOMAS S. SHENSTON, OF BRANTFORD, CANADA.

IMPROVEMENT IN INKSTANDS.

Specification forming part of Letters Patent No. 144,929, dated November 25, 1873; application filed January 3, 1872.

*To all whom it may concern:*

Be it known that I, THOMAS S. SHENSTON, of Brantford, in the county of Brant, Province of Ontario, Canada, have invented a new and Improved Inkstand; and I do hereby declare that the following is a full, clear, and exact description of the same, reference being had to the accompanying drawing forming a part of this specification.

My invention has for its object to provide an improved reversible ink and mucilage stand, adapted to preserve its contents free from access of dust, atmospheric air, &c., when not in use.

In the drawing, Figure 1 is a side elevation of my improved inkstand, and Fig. 2 is a sectional elevation thereof. Fig. $2^a$ is a sectional elevation of the stand inverted.

The inkstand A, which may be made of any suitable material, and have a cylindrical or other approved form exteriorly, has a pear or cone shaped chamber, B. The bottom of the chamber is closed by a plug, $a$, which may be removed when the contents of said chamber require to be discharged. An inverted truncated cone, C, projects downward into the chamber from the top thereof, and a tube, D, is arranged in the mouth of the cone to project downward and upward, as shown in Figs. 2, $2^a$. A cone-shaped cavity, E, corresponding to the cone C, is also provided in the bottom of the stand.

When the stand is not required for use it is inverted, and the outer end of tube D immersed in quicksilver contained in a receptacle, F, which is of a truncated cone-like form, to adapt it to fit into the hollow of the cone C, as shown in Fig. $2^a$. When the stand is thus inverted, the fluid contents flow into the enlarged annular cavity which surrounds the cone C of chamber B.

The inner portion of the tube D may be regarded simply as a continuation of the cone C, and having a like function, to wit, to prevent escape of the contents of the chamber.

When the stand A is in use, the sealing-vessel F is placed under it in the cavity E.

It is obvious that, when not in use, my improved stand will prevent that deterioration of the quality of its contents, by access of dust or other foreign substance and by the evaporation, which must constantly go on when the air is not excluded, which are inevitable consequences attending the use of the ordinary stand.

Having thus described my invention, what I claim as new, and desire to secure by Letters Patent, is—

1. An ink or mucilage stand or receptacle having a tube projecting into its chamber, whereby it is adapted to be inverted without discharge of its contents, in combination with a receptacle for liquid for temporarily sealing the mouth of said tube, as set forth.

2. In combination with the sealing-liquid receptacle, the stand A, provided with the tube $b$, projecting upward in the conical cavity C, and downward into the chamber B, as and for the purpose specified.

THOMAS STRAHAN SHENSTON.

Witnesses:
LIZZIE REYNOLDS,
ANDREW CHITTENDEN.